Feb. 22, 1944.　W. J. ETTINGER ET AL　2,342,461
TIMING DEVICE
Filed Oct. 31, 1939　2 Sheets-Sheet 1
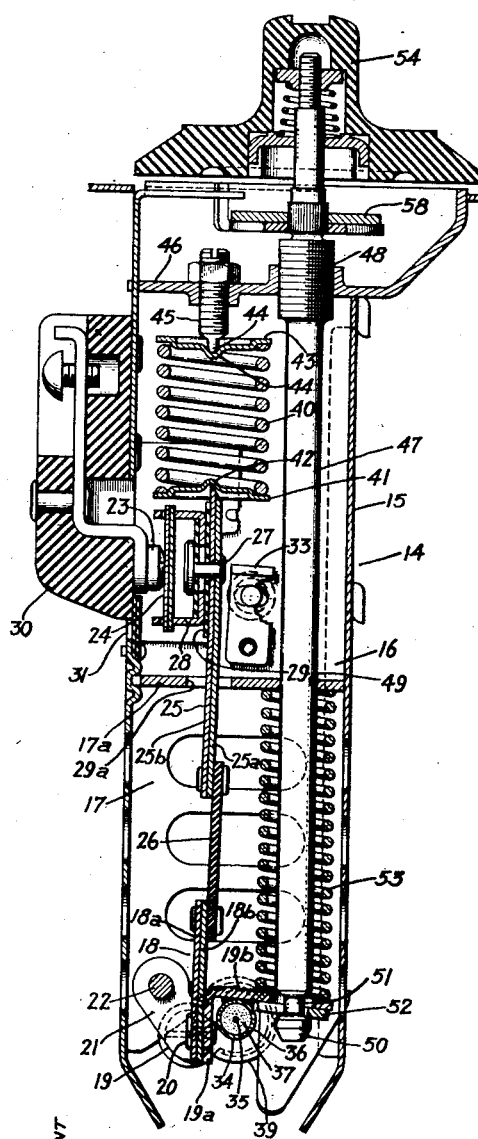
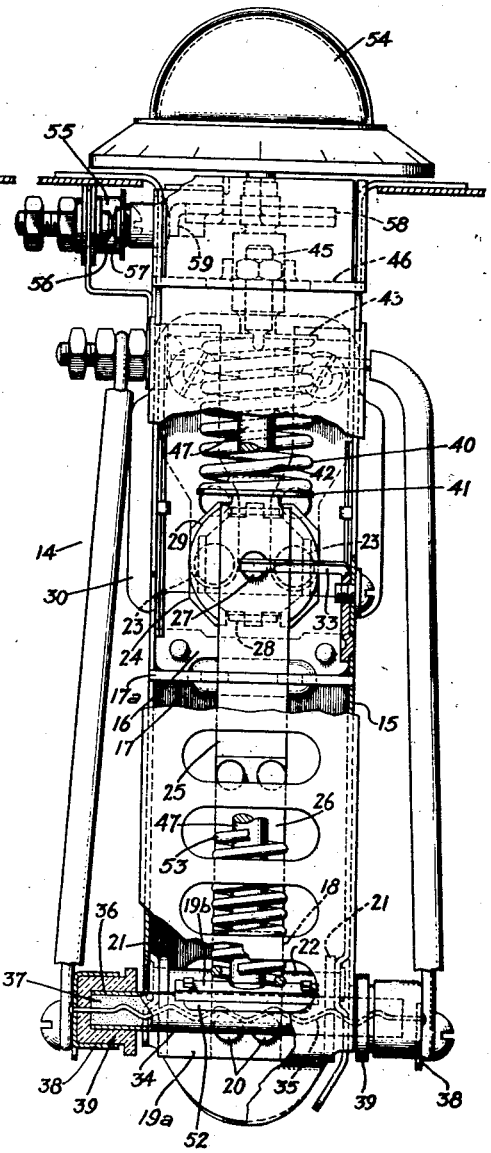
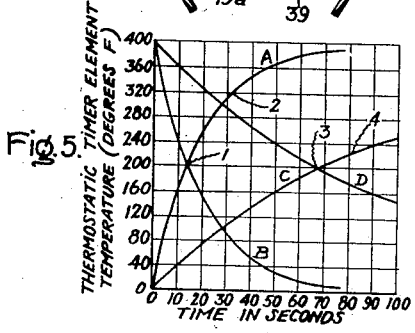
Inventors:
Wallace J. Ettinger,
Russell A. Winborne,
by Harry E. Dunham
Their Attorney.

Feb. 22, 1944.    W. J. ETTINGER ET AL    2,342,461
TIMING DEVICE
Filed Oct. 31, 1939    2 Sheets-Sheet 2

Inventors:
Wallace J. Ettinger,
Russell A. Winborne,
by Harry E. Dunham
Their Attorney.

UNITED STATES PATENT OFFICE 2,342,461

TIMING DEVICE

Wallace J. Ettinger, Chicago, and Russell A. Winborne, Oak Park, Ill., assignors, by mesne assignments, to Edison General Electric Appliance Company, Inc., a corporation of New York Application October 31, 1939, Serial No. 302,156

5 Claims. (Cl. 200—122)

This invention relates to timing devices, more particularly to thermostatic timing devices, and it has for its object the provision of a timing device of this character having an improved, simple and inexpensive construction and one providing an extremely accurate and uniform timing operation.

While not limited thereto, this invention is particularly applicable to the regulation or measurement of the heating intervals of a heating device, such as the hotplate of an electric range.

In accordance with this invention, a suitable temperature responsive element, such as a bimetallic thermostat bar, is provided to control the flow of energy to the controlled device. The thermostatic bar is arranged to move between two controlling positions responsively to temperature changes. The bar when in one position causes energy to flow to the controlled device and when in the other shuts off the flow of energy to the device. A heating element, preferably having an appreciable thermal storage mass, applies heat to the bar to cause it to move from its one position where it supplies energy to the controlled device to its other position where it shuts off energy from the device, the heating element being controlled to apply heat to said bar when energy is supplied to the controlled device and to remove heat from the bar when the energy is shut off from the controlled device. A spring coacts with the bar to cause it to move between its controlling positions with a positive snap action. The spring provides a substantially uniform amplitude between the high and low temperatures at which the bar moves between its two controlling positions, and together with the large thermal mass heating element insures uniform timing in successive operations of the timing device. Preferably, a temperature responsive element compensating for ambient temperature changes will be interposed between the thermostat bar and the spring, and this compensation element will be thermally insulated from the thermostat bar so that it will not be influenced by the temperature of the thermostat bar and its heating means.

Figure 3:
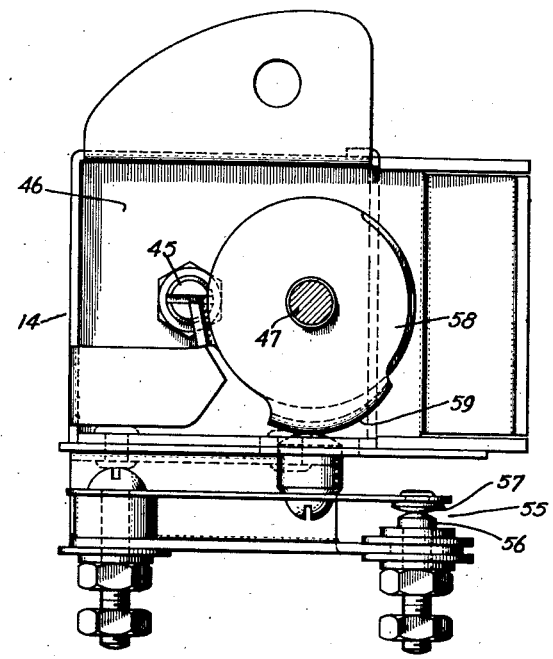
Figure 4:
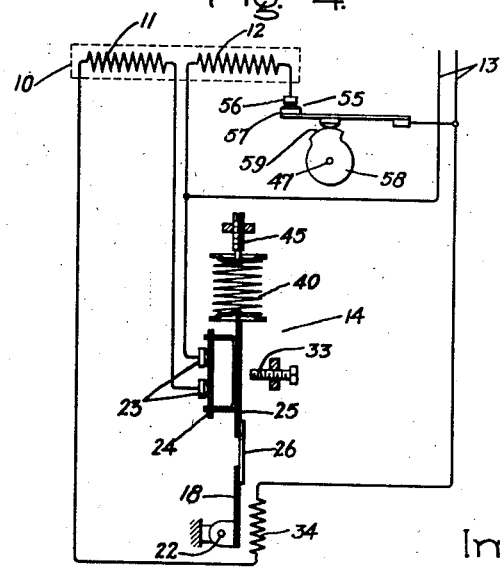

For a more complete understanding of this invention, reference should be had to the accompanying drawings in which Fig. 1 is a side elevation in section of a thermostatic timing device embodying this invention; Fig. 2 is a front elevation of the thermostatic timing device of Fig. 1, parts being broken away so as to illustrate certain details of construction; Fig. 3 is a plan view of the timing device of Figs. 1 and 2 with certain elements removed so as to illustrate certain details of construction; Fig. 4 is a diagrammatic representation of an electric hotplate controlled by the thermostatic timing device in accordance with this invention; and Fig. 5 is a diagrammatic representation illustrating a temperature and time relationship in a particular thermostatic timing device arranged in accordance with this invention.

Referring to the drawings, this invention has been shown as applied to a thermostatic timing device intended to be used to control the energy to an electric hotplate 10 (Fig. 4). This hotplate is provided with a pair of heating elements 11 and 12 of any suitable construction and having any suitable wattage rating. The heating elements 11 and 12 are provided with a suitable electrical supply source 13. The control of the flow of energy from the supply source 13 to the heating elements 11 and 12 is effected by a suitable thermostatic timing device 14, shown diagrammatically in Fig. 4 and in detail in Figs. 1, 2 and 3.

The timing device 14 comprises an elongated casing 15 divided into two chambers 16 and 17 by a transverse wall 17a. Mounted within the chamber 17 is a suitable operating temperature responsive timing element 18. The timing element 18 may be any suitable temperature responsive device, but preferably will be of the bimetallic type formed of high and low expansion elements 18a and 18b. These elements may be formed of any suitable material; thus, the high expansion element 18a may be formed of a suitable nickel-chrome steel while the low expansion element 18b may be formed of invar.

The bimetallic bar 18 has one end rigidly mounted on a support 19, which, as shown, has a transverse portion 19a to which the end of the thermostatic bar 18 is rigidly secured, as by means of rivets 20, and also with ears 21 arranged at right angles to the transverse portion 19a and which are pivoted upon a transverse shaft 22 that has its ends mounted in opposite walls of the casing 15, as shown.

The actuating temperature responsive element 18 is utilized to control a suitable control element for one of the heating elements 11 and 12. In the specific example illustrated, the element 18 controls the heating element 11.

In the specific example illustrated, the control device actuated by the thermostatic bar 18 is a switch having a pair of spaced fixed contacts 23 mounted within the chamber 16 and which are engaged by a bridging contact 24 also mounted within the chamber 16. The bridging contact 24 is actuated by the movement of the free end of the thermostatic bar 18. The movement of this free end is transmitted to the bridging contact 24 through a second thermostatic element 25 and a thermally insulating member 26 which rigidly secures the free end of the thermostatic bar 18 to one end of the thermostatic element 25, as shown. The bridging contact 24, as shown, is secured to the other or free end of the thermostatic element 25 by any suitable means such as a rivet 27. The bridging contact 24 is directly mounted on a U-shaped bracket 28 which has its base secured to the element 25 by the rivet 27. The base is electrically insulated from the thermal element 25 and from the rivet 27 by sheets of electrically insulating material 29 which may be and preferably will be formed of mica. As shown, the thermostatic element 25 is directed upwardly through an aperture 29a formed in the wall 17a. The thermostatic element 25 also preferably will be formed of high and low expansion elements of dissimilar material, such as a nickel chrome steel and Invar. Here, however, the element 25a is the high expansion side, while the element 25b is the low expansion side. In other words, this thermostatic element moves in a direction opposite to the direction of movement of the element 18 in response to temperature changes. The element 25 is provided to compensate for variations in the ambient temperature.

The spaced fixed contacts 23, as shown, are mounted in an electrically insulating block 30 formed of any suitable material, such as a phenol condensation product. This insulating block 30 is mounted on the exterior of a wall of the housing 15, but it presents the fixed contacts 23 to the bridging contact 24 through an opening 31 in this wall of the housing.

The actuating bar 18 moves between its position where the bridging contact 24 engages the fixed contacts 23 to a second controlling position wherein the contacts are opened, and which position is defined by a stop 33 mounted in the chamber 16. The thermostatic elements 18 is caused to thus actuate the bridging contact when its temperature is raised, and for the purpose of raising its temperature a suitable heating element 34 is provided for applying heat directly to the fixed end of the thermostatic element 18. The heating element 34 preferably will have considerable thermal mass, and as shown, it comprises a resistance conductor 35 mounted within a tubular metallic sheath 36, and embedded in and supported in spaced relation with reference to the sheath by a highly compacted mass of electrically insulating, heat refractory and heat conducting material 37. Preferably, the material 37 will be highly compacted granular magnesium oxide. The metallic sheath 36, as shown, is directly connected to the supporting bracket 19, and preferably is connected to a right-angle extension 19b formed on the transverse section 19a. Preferably, the sheath 36 will be secured to this extension by means of welding. The terminal ends of the resistance conductor 35 protrude from the ends of the tubular sheath 36, as shown, and they are electrically connected to suitable terminals 38. These terminals are of cup-shaped form and are electrically insulated from the sheath 36 by electrically insulating cups 39 formed of any suitable material, such as porcelain. These terminals are utilized to connect the heating element into the control circuit in a manner to be presently described.

It is to be understood that when the heating element 34 heats the actuating member 18 to a predetermined high temperature it will cause this element to move the bridging contact 24 away from the fixed contacts 23, the movement in this direction being limited by the stop 33, and that when the heating element is deenergized, the bar 18 will cool and upon obtaining a predetermined low temperature will return the bridging contact 24 to close the contacts 23. The differential between the high temperature at which the bridging contact opens the contacts 23 and the low temperature at which it recloses them is known as the temperature amplitude of the control device.

It is very important, to insure uniform timing operations, that this temperature amplitude be constant in succeeding timing cycles. In order to insure a substantial constant temperature amplitude, we provide a suitable spring 40 coacting with the temperature responsive element 18 to cause the bridging contact to move between the fixed contacts 23 and the stop 33 with a positive snap action. In the example illustrated, the spring 40 is a compression spring, and it has one end bearing on a collar 41 having a knife-edge connection 42 with the free end of the compensating thermostat 25, and its opposite end bearing on a collar 43 having a knife-edge connection 44 with a fixed adjustable bearing 45. This bearing 45 is mounted in a transverse wall 46 which is positioned opposite the transverse wall 17a and which closes the opposite end of the chamber 16. The position of the bearing 45 with reference to the free end of the compensating thermostat 25 may be varied to vary the compression of the spring 40. This will change the temperature amplitude.

The line setting of the control device is changed by shifting the position of the support 19 on its shaft 22, which operation varies the angular relation of the bimetallic element 18 and the spring 40 so that more or less movement is required to produce the snap action of the element 18. It will be understood that when this angular relation is changed the stress in the bimetallic element is changed; if this stress be increased, more elapsed time is required to reach the time setting, whereas if the stress be reduced, less elapsed time is required to reach the time setting. The adjustment of the support 19 is accomplished by an adjusting rod 47 extending longitudinally through the chambers 16 and 17 and having a threaded connection 48 with the wall 46. The rod, as shown, extends through an aperture 49 provided for it in the transverse wall 17a and at its end opposite the threaded connection 48 has a mechanical connection with the bracket 19. As shown, the arm 19b of the bracket 19 has an aperture receiving the adjacent end of the rod 47 which is provided with an abutment 50 spaced somewhat from the body proper of the rod so as to leave the reduced section 51 which is received in the aperture of the arm 19b. A plate 52 with a key hole slit surrounds the reduced portion 51 on one side of the arm 19b to prevent withdrawal of the rod from the arm, as shown. A helical compression spring 53 is mounted on the rod 47, and has one end bearing against the arm 19b and its other end bearing against the wall 17a. To the outer end of the rod is attached a suitable adjusting knob 54 wherey the position of the rod may be changed. It will be observed that the rod may be turned to move it inwardly and outwardly, and thereby vary the position of the support 19 and of the bimetallic element 18 to vary the time setting.

As applied to the control of the element 11 in the example illustrated in Fig. 4, the heating element 34 is electrically connected in series with the supply source 13 and the heating element 11. Thus, when the bridging contact 24 engages the fixed contacts 23 to energize the heating element 11, the heating element 34 also will be energized to apply heat to the thermostatic actuating member 18. As previously described, when the heating element 34 heats the member 18 to a predetermined high temperature, which temperature will depend upon the setting of the knob 54, the actuating element 18 will operate the bridging contact to open the switch and thereby deenergize the heating element 11; at the same time the heating element 34 will be deenergized so as to remove heat from the thermostatic element 18. The thermostatic element 18 thereupon will cool and upon attaining the low temperature of the temperature amplitude will return the bridging contact 24 to its closed position to reenergize the heating element 11. In this manner, the timing device will operate to regulate the flow of energy to the heating element 11 in a series of timed cycles.

The mass of the heating element 34 is a very important aspect of this invention. It is desirable that the heating element 34 have an appreciable thermal mass because we have found that when it has a large mass it permits obtaining an extremely wide range of timing with small temperature rise in the thermostatic element 18; and also enhances accuracy in timing adjustment. We have found that a heating element having a small thermal mass heats and cools so rapidly that it is difficult to obtain a very large variation in the timing cycles and is difficult to control. The importance of providing a large thermal mass may be seen graphically by reference to Fig. 5. In this figure, the curves A and B illustrate the rates of heating and cooling of a timer thermostat provided with a low thermal mass heating unit, while the curves C and D show the rates of heating and cooling of a timer thermostat provided with a heating unit having a thermal mass substantially five times as great as that of the first. Four hundred degrees Fahrenheit is selected arbitrarily as the maximum temperature that either of the heating elements would reach, that is, the temperature where the heat radiation by convection, conduction, etc., equals the wattage input. It will be observed by reference to these curves that for the same total period of timing for each heating unit, the temperature differential of the thermostatic element having a high thermal mass unit is considerably less than that of the other so that a much greater temperature range for timing adjustments is available, and moreover, it will be observed that the temperature rise in the thermostatic element having the high thermal mass is considerably less than in the other. For example, suppose a time interval of twenty-eight seconds is desired from the time at which heat is applied to the controlled device to the time at which it is reapplied. This is obtained in the thermostatic timing device having the low mass heating element by heating it from 200° F. to a temperature of 320° F., that is, from points 1 to 2; it will be observed from curve A that this operation will require eighteen seconds; in cooling from 320° F. to 200° F. a ten second timing interval is required (curve B) so that in heating and cooling a total time interval of twenty-eight seconds is required. Also, it will be observed, a temperature differential of 120° F. is developed. In other words, twenty-eight seconds elapses from the time at which heat is shut off from the hotplate and reapplied to it. In the case of the thermostat having the heavy thermal mass heating element this twenty-eight second time interval is obtained by heating the element fifteen seconds from point 3 to point 4 (curve C) and permitting it to cool for a thirteen second interval (curve D). In heating from point 3 to point 4, the thermostat temperature is elevated only from 200° F. to 224° F. giving a temperature amplitude of only 24° F., as distinguished form the case of the thermostat having the low mass heating element where the temperature differential is 120° F. Therefore, assuming four hundred degrees Fahrenheit as the maximum temperature, as previously pointed out, if we subtract from this temperature the low mass temperature differential of 120° F. we have left only 280° F. available for timing adjustment, whereas in the case of the high mass element we have the difference between 400° F. and 24° or 376° F. available for timing adjustment. It will also be observed that curves C and D provide a much more gradual change in timing at the end regions of the temperature differential which facilitates greatly the accuracy in timing adjustment.

The provision of the high thermal mass heating element acting jointly with the spring 40 insures reliability and uniformity in timing.

Another important feature is the location of the heating element 34 at the base of the timing element 18. Heat applied at this point has its greatest effect on the deflection of bimetallic bar 18. Should the bar be heated along its length the control of the deflection of the bar becomes very difficult because of the greater distribution of the heat over the length of the bimetallic bar and other parts of the timing mechanism associated with the bar.

The control device further contemplates the provision of suitable means for simultaneously energizing the heating elements 11 and 12 in order to obtain a very high rate heat generation. For this purpose, a switch 55 is provided having a fixed contact 56 and a movable contact 57 connected between the supply source 13 and the heating element 12, as shown in Fig. 4. The movable contact member 57 is controlled by means of a cam member 58 mounted on the shaft 47 so as to be under the control of the knob 54. The parts are so arranged that when the lift 59 of the cam engages the contact member 57 to close it to energize heating element 12, as shown in Figs. 3 and 4, the heating element 11 also will be energized through contacts 23 and 24; and the parts are so arranged that when the cam is in this position the temperature responsive element 18 will be adjusted to such a high temperature position that the heating element 34 even though energized cannot elevate the temperature of the bar 18 sufficiently high to open the contacts 23. However, when the shaft is operated to remove the lift 59 to permit the switch 55 to open and thereby deenergize the heating element 12, the temperature responsive to element 18 will be adjusted to regulate or meter the energy to the heating element 11, the amount supplied to the element 11 depending upon the position of the control knob 54, as previously described. The means here described, providing for the continuous energization of the two heating elements 11 and 12, and for the regulated control of the heating element 11, is described and claimed in our copending application, Serial No. 333,758, filed May 7, 1940, and which is a division of this application.

It is to be understood that while this timing device has been shown as applied to the control of an electrically heated hotplate it may be utilized to control many other heating devices.

Also, while the timing device operates in a series of successive cycles to regulate the energy to the hotplate, it is to be understood that the amplitude of the timing device may be so set that it will operate to time a cooking operation in a single cycle. For example, it may be used to time the cooking of a waffle or a slice of bread, the timing interval being measured by the length of time required for the heating element 34 to cause the actuating member 18 to operate the bridging contact 24 from its closed position to its open position against the stop 33.

While we have shown a particular embodiment of our invention, it will be understood, of course, that we do not wish to be limited thereto since many modifications may be made and we, therefore, contemplate by the appended claims to cover any such modifications as fall within the true spirit and scope of our invention.

What we claim as new and desire to secure by Letters Patent of the United States is:

1. A thermostatic timing device comprising a bimetallic thermostat actuating bar having one end fixed and its other end free to move, a heating element for applying actuating heat only to said fixed end of said bar to cause said free end to move in one direction, a bimetallic compensating bar, a thermally insulating member connecting one end of said compensating bar with said free end of said actuating bar so that said compensating bar is supported thereby, the compensating bar moving in a direction opposite to the movement of said actuating bar under the influence of temperature changes, a spring acting on the other end of said compensating bar moving the two bars with a snap action between two positions so as to insure uniform temperature amplitude of operation of said timing device between said two positions, and means for adjusting the position of said actuating bar so as to adjust the time setting of said timing device.

2. A thermostatic timing device comprising a temperature responsive actuating element having one end fixed and its other end free to move, a spring acting on said free end to move it with a positive snap action from one to the other of two positions and thereby give it a substantially uniform temperature amplitude, a high heat capacity heating element having a metallic sheath positioned at the fixed end of said temperature responsive element in direct thermal relation with it, a heating resistance element housed within said sheath and a compacted mass of electrically insulating and heat conducting material within said sheath embedding said resistance element and placing it in thermal relation with said sheath, and switch means controlled by the free end of said temperature responsive element controlling the energization of said heating resistance element to alternately energize and deenergize it responsively to the cooling and heating of said temperature responsive element.

3. A thermostatic timing device comprising a bimetallic thermostat actuating bar having one end fixed and its other end free to move, a high heat capacity heating element having a metallic sheath positioned at the fixed end of said thermostat bar in direct thermal relation with it, a heating resistance element housed within said sheath and a compacted mass of electrically insulating and heat conducting material within said sheath embedding said resistance element and placing it in thermal relation with said sheath, the heating element when energized applying heat to said bar at a determined rate to cause it to move in one direction, a bimetallic compensating bar, a thermally insulating member connecting one end of said compensating bar with said free end of said actuating bar, the compensating bar moving in a direction opposite to the movement of said actuating bar under the influence of temperature changes, and a spring acting on the other end of said compensating bar moving the two bars with a snap action between two positions so as to insure a uniform temperature amplitude of operation of said timing device between said two positions.

4. A thermostatic timing device for an electrically heated device having an energizing circuit comprising a bimetallic thermostat actuating bar having one end fixed and its other end free to move in one direction, a bimetallic compensating bar, a length of thermally insulating material connecting one end of said compensating bar with said free end of said actuating bar so that said compensating bar is supported and actuated thereby, the compensating bar moving in a direction opposite to the movement of said actuating bar under the influence of temperature changes, a switch for controlling the energization of said heating device electrically insulated from the other end of said compensating bar, and the movement of said other end functioning to operate said switch to open and close said energizing circuit so as to regulate the flow of electrical energy to said heated device, a heating element constructed and arranged to apply actuating heat directly only to said actuating bar for causing actuating movement thereof, and a control energizing circuit for said heating element controlled by said switch so that when the switch opens said energizing circuit for said heated device said heating element is deenergized, whereas when it closes said energizing circuit said heating element is energized.

5. A thermostatic timing device comprising a bimetallic thermostat actuating bar having one end fixed and its other end free to move, a heating element positioned at said fixed end of said bar and constructed and arranged to apply its generated heat to said fixed end, said free end being moved in one direction when said fixed end is heated, a bimetallic compensating bar, a length of thermally insulating material connecting one end of said compensating bar with said free end of said actuating bar, the compensating bar moving in a direction opposite to the movement of said actuating bar under the influence of temperature changes, and a control device actuated by the other end of said compensating bar controlling the energization of said heating element so as to cause said heating element to apply heat to said actuating bar to cause the compensating bar to move in one direction, whereupon the heat is removed from the actuating bar to permit it to cool to move the compensating bar in the other direction.

WALLACE J. ETTINGER.
RUSSELL A. WINBORNE.

CERTIFICATE OF CORRECTION.

Patent No. 2,342,461.   February 22, 1944.

WALLACE J. ETTINGER, ET AL.

It is hereby certified that error appears in the printed specification of the above numbered patent requiring correction as follows: Page 2, second column, line 41, for "line" read --time--; page 3, second column, line 20, for "Fahreheit" read --Fahrenheit--; line 70, after "responsive" strike out "to"; page 4, first column, line 32, claim 1, for "comprisiing" read --comprising--; and that the said Letters Patent should be read with this correction therein that the same may conform to the record of the case in the Patent Office.

Signed and sealed this 16th day of May, A. D. 1944.

Leslie Frazer (Seal)   Acting Commissioner of Patents.